United States Patent
Duleba et al.

(10) Patent No.: US 10,230,687 B1
(45) Date of Patent: Mar. 12, 2019

(54) APPARATUS AND METHOD FOR CORRELATING ADDRESSES OF DIFFERENT INTERNET PROTOCOL VERSIONS

(71) Applicant: GOOGLE Inc., Mountain View, CA (US)

(72) Inventors: Krzysztof Duleba, Pfaffikon (CH); Andras Erdei, Zurich (CH)

(73) Assignee: Google LLC, Mountain View, CA (US)

( * ) Notice: Subject to any disclaimer, the term of this patent is extended or adjusted under 35 U.S.C. 154(b) by 327 days.

(21) Appl. No.: 13/679,542

(22) Filed: Nov. 16, 2012

Related U.S. Application Data

(60) Provisional application No. 61/560,735, filed on Nov. 16, 2011.

(51) Int. Cl.
  *G06F 15/173* (2006.01)
  *H04L 29/12* (2006.01)

(52) U.S. Cl.
  CPC .................. *H04L 61/25* (2013.01)

(58) Field of Classification Search
  CPC .................................... H04L 69/167
  USPC ............................. 709/226, 230, 223
  See application file for complete search history.

(56) References Cited

U.S. PATENT DOCUMENTS

| | | | | |
|---|---|---|---|---|
| 2002/0150104 A1* | 10/2002 | Hamamoto | ....... | H04L 29/12358 370/392 |
| 2003/0185236 A1* | 10/2003 | Asano | .................. | H04L 69/161 370/469 |
| 2004/0233916 A1 | 11/2004 | Takeuchi et al. | | |
| 2004/0246991 A1* | 12/2004 | Tsuzuki | ............ | H04L 29/12358 370/466 |
| 2006/0215657 A1* | 9/2006 | Lee | ..................... | H04L 12/4633 370/389 |

(Continued)

FOREIGN PATENT DOCUMENTS

| | | |
|---|---|---|
| EP | 1646207 | 4/2006 |
| JP | 2009207182 | 9/2009 |

(Continued)

OTHER PUBLICATIONS

Chen, Maoke, et al., Forwarding IPv4 Traffics in Pure IPv6 Backbone with Stateless Address Mapping, 2006 IEEE, pp. 260-270.

(Continued)

*Primary Examiner* — Wing F Chan
*Assistant Examiner* — Andrew Woo
(74) *Attorney, Agent, or Firm* — McDermott Will & Emery LLP

(57) ABSTRACT

Provided is a method of correlating an Internet Protocol version 4 (IPv4) address with an Internet Protocol version 6 (IPv6) address. The method may include communicating, via the Internet, an IPv4-addressed signal transmitted to, or received from, an IPv4-capable computing device. The method may also include communicating, via the Internet, an IPv6-addressed signal transmitted to, or received from, an IPv6-capable computing device. The method may further include determining that the IPv4-capable computing device and the IPv6-capable computing device are the same computing device based on the IPv4-addressed signal and the IPv6-addressed signal, and storing in memory data indicating a correlation between at least part of the IPv4 address and at least part of the IPv6 address.

15 Claims, 7 Drawing Sheets

(56) References Cited

U.S. PATENT DOCUMENTS

| | | | |
|---|---|---|---|
| 2006/0227792 A1* | 10/2006 | Wetterwald et al. | 370/395.52 |
| 2007/0258399 A1* | 11/2007 | Chen | H04L 29/12358 370/328 |
| 2009/0157900 A1* | 6/2009 | Ge | H04L 12/4633 709/236 |
| 2009/0245278 A1* | 10/2009 | Kee | H04L 29/12358 370/467 |
| 2010/0246443 A1* | 9/2010 | Cohn | H04L 12/4641 370/255 |
| 2011/0182291 A1* | 7/2011 | Li | H04L 29/12066 370/389 |
| 2011/0283018 A1* | 11/2011 | Levine | H04L 29/12066 709/245 |

FOREIGN PATENT DOCUMENTS

| | | |
|---|---|---|
| WO | 2010037893 | 4/2010 |
| WO | 2011/020102 | 2/2011 |

OTHER PUBLICATIONS

Wikipedia, Application Layer, retrieved from http://en.wikipedia.org/wiki/Application_layer, Nov. 14, 2011, 6 pages.
Wikipedia, Web Analytics, retrieved from http://en.wikipedia.org/wiki/Web_analytics, Nov. 14, 2011, 12 pages.
Wikipedia, Transport Layer, retrieved from http://en.wikipedia.org/wiki/Transport_layer, Nov. 14, 2011, 5 pages.
Quova, Inc., About World IPv6 Day, retrieved from http://www.quova.com/blog-2/about-world-ipv6-day/, Nov. 14, 2011, 4 pages.

* cited by examiner

APPARATUS AND METHOD FOR CORRELATING ADDRESSES OF DIFFERENT INTERNET PROTOCOL VERSIONS

CROSS-REFERENCE TO RELATED APPLICATIONS

The present application claims the benefit of U.S. Provisional Patent Application 61/560,735, filed Nov. 16, 2011, which is hereby incorporated by reference in its entirety.

BACKGROUND OF THE INVENTION

1. Field of the Invention

The present invention relates generally to the Internet and, more specifically, with techniques for correlating addresses of different internet protocol versions.

2. Description of the Related Art

Generally, communications over the Internet occur according to a version of the Internet Protocol, which among other things defines the format for addresses of computing devices, or nodes, connected to the Internet. Under the dominant version of the Internet protocol presently, Internet Protocol version 4 (IPv4), the address space, or number of usable addresses, is proving insufficient due to the number of nodes connected to the Internet. Accordingly, a transition to a newer version of the Internet Protocol, Internet Protocol version 6 (IPv6), which provides for a substantially larger address space, is underway.

The transition from IPv4 to IPv6 impedes the operation of some systems that perform tasks based on an Internet Protocol address. For example, companies have made substantial investments building systems and accumulating data that correlates IPv4 addresses with various types of data, such as geolocation, reputation, network attributes, node attributes, or user attributes. Moreover, some server systems perform various tasks that are based on the IPv4 address of a client computing device with which the server system is communicating. For example, some servers perform load-balancing, content localization, search result ranking, advertisement selection, and the like based on the IPv4 address of a requesting client device. Many of these systems are incapable of performing such tasks based on the IPv6 address of a requesting client device. Consequently, the transition to IPv6 is expected to impede the operation of these systems when communicating with a client computing device having an IPv6 address.

SUMMARY OF THE INVENTION

The following is a non-exhaustive listing of some aspects of the present techniques. These and other aspects are described in the following disclosure.

In some aspects, the present invention includes a method of correlating an IPv4 address with an IPv6 address. The method may include communicating, via the Internet, an IPv4-addressed signal transmitted to, or received from, an IPv4-capable computing device. The method may also include communicating, via the Internet, an IPv6-addressed signal transmitted to, or received from, an IPv6-capable computing device. The method may further include determining that the IPv4-capable computing device and the IPv6-capable computing device are the same computing device based on the IPv4-addressed signal and the IPv6-addressed signal, and storing in memory data indicating a correlation between at least part of the IPv4 address and at least part of the IPv6 address.

Some aspects include a computer system for correlating an IPv4 address with an IPv6 address. The computer system may have an IPv6 network interface, an IPv4 network interface, one or more processors, and memory storing instructions that when executed by one or more of the one or more processers causes steps including those subsequently described to occur: communicating, via the Internet and the IPv4 network interface, an IPv4-addressed signal transmitted to, or received from, an IPv4-capable computing device; communicating, via the Internet and the IPv6 network interface, an IPv6-addressed signal transmitted to, or received from, an IPv6-capable computing device; determining that the IPv4-capable computing device and the IPv6-capable computing device are the same computing device based on the IPv4-addressed signal and the IPv6-addressed signal; and storing in the memory data indicating a correlation between at least part of the IPv4 address and at least part of the IPv6 address.

Some aspects include a method of correlating clusters of IPv4 addresses with clusters of IPv6 addresses. The method may include obtaining a plurality of matched pairs of IPv4 addresses and IPv6 addresses, each matched pair including an IPv4 address and an IPv6 address both of the same computing device; obtaining an IPv6 address cluster including a plurality of IPv6 addresses; obtaining a plurality of IPv4 address clusters, each IPv4 address cluster including a plurality of IPv4 addresses associated with a geographic area; selecting a subset of matched pairs among the plurality of matched pairs of IPv4 addresses and IPv6 addresses, the subset being selected based on IPv6 addresses of the members of the subset being members of the IPv6 address cluster; determining that a selected IPv4 address cluster among the plurality of IPv4 address clusters is correlated with the IPv6 address cluster based on the subset of matched pairs among the plurality of matched pairs of IPv4 addresses and IPv6 addresses; and storing in memory data indicating a correlation between the selected IPv4 address cluster and the IPv6 address cluster.

Some aspects include a method of accessing data indexed by IPv4 addresses based on an IPv6 address. The method may include obtaining data indexed according to IPv4 addresses; receiving an IPv6 address; obtaining a plurality of IPv6-address clusters, a plurality of IPv4-address clusters, and data identifying correlations between each of IPv6-address clusters among the plurality of IPv6-address clusters and IPv4-address clusters among the plurality of IPv4-address clusters; identifying an IPv6-address cluster among the plurality of IPv6-address clusters of which the IPv6 address is a member; identifying an IPv4-address cluster among the plurality of IPv4-address clusters correlated with the identified IPv6 cluster based on the data identifying correlations between each of IPv6-address clusters and IPv4-address clusters; and selecting a subset of the data indexed according to IPv4 addresses based on the identified IPv4-address cluster.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
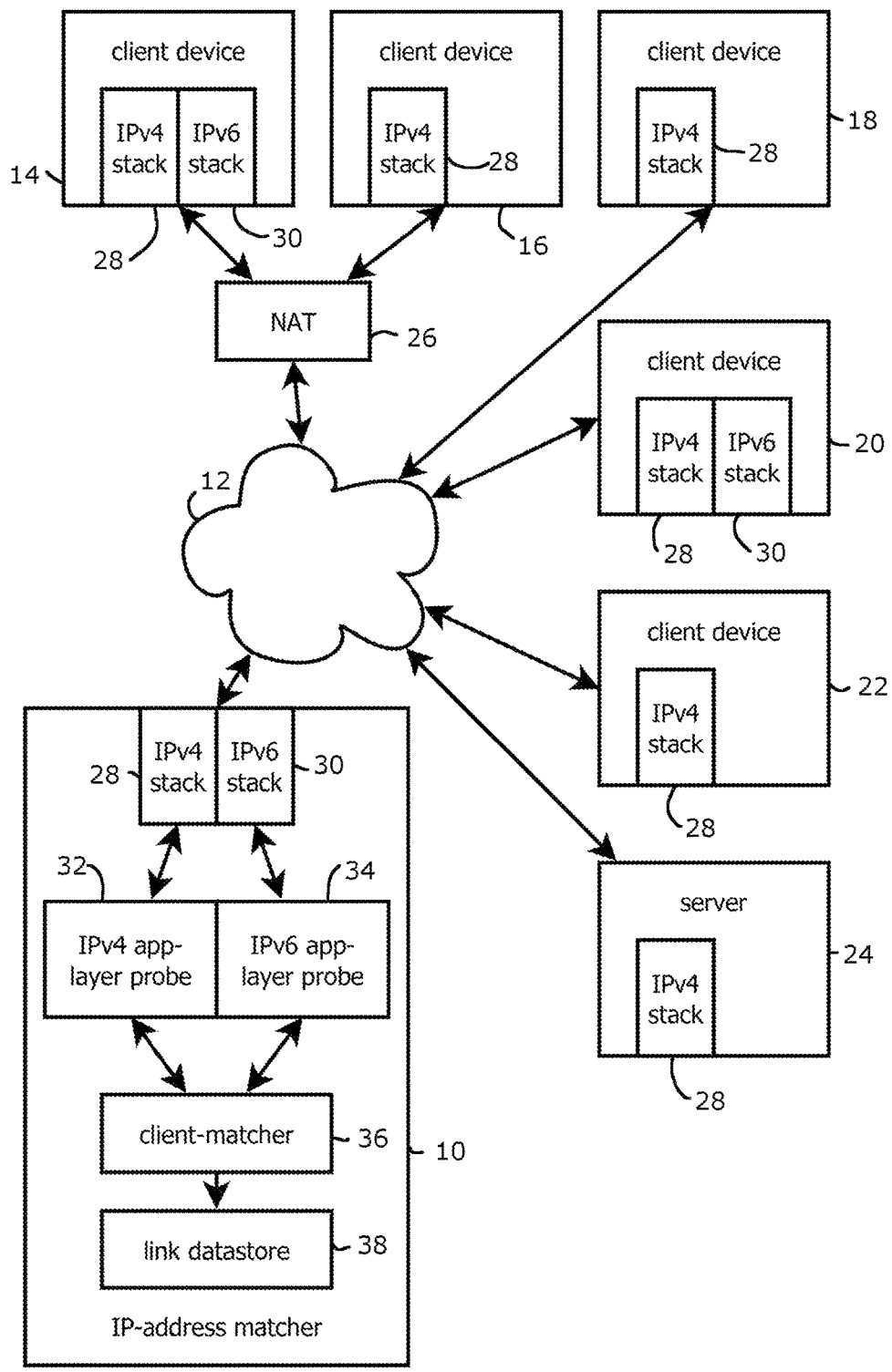
FIG. 1 is a block diagram showing an example of client devices communicating over the Internet with an embodiment of an Internet Protocol-address matcher.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

FIG. 1 shows an embodiment of an IP-address matcher 10 capable of communicating via the Internet 12 with client devices 14, 16, 18, 20, and 22, and a server 24. As explained in greater detail below with reference to FIGS. 2-6, the IP-address matcher 10 is capable of operating using either the IPv4 or IPv6 protocol, and is therefore capable of identifying a matched IPv4 and IPv6 address pair assigned to client devices also capable of operating using either the IPv4 or IPv6 protocol, such as client devices 14 and 20. As described in greater detail below with reference to FIGS. 7 and 8, by identifying such matched IPv4-IPv6 matched pairs, clusters of IPv4 addresses may be correlated with clusters of IPv6 addresses. This in turn allows data indexed according to an IPv4 address cluster to be accessed based on an IPv6 address, e.g., by mapping the IPv6 address to an IPv6 address cluster, and mapping the IPv6 address cluster to its corresponding IPv4 address cluster. Rendering IPv4-cluster indexed data accessible via an IPv6 address is expected to reduce the cost of supporting IPv6 among entities that provide data or services based on the IPv4 addresses of the computing devices that communicate with those services.

In some embodiments, the IP-address matcher 10 is capable of communicating with an IPv4-capable computing device, such as one of the illustrated client devices 14, 16, 18, 20, or 22, by transmitting an IPv4 addressed data packet to or receiving an IPv4 addressed data packet from the IPv4-capable computing device. Likewise, the IP-address matcher 10 is capable of communicating with an IPv6-capable computing device, such as the client devices 14 or 20, by transmitting an IPv6 addressed data packet to or receiving an IPv6 addressed data packet from the IPv6-capable computing device. Further, as explained in greater detail below, in some embodiments the IP-address matcher 10 is capable of determining that a given computing device (e.g., client device 14), is both IPv4- and IPv6-capable by exchanging both IPv4 and IPv6 addressed data packets with the client device 14. In this way, IP-address matcher 10 is capable of determining both the IPv4 and IPv6 addresses assigned to client device 14, and storing in memory data indicating a correlation or match between the IPv4 and IPv6 addresses assigned to client device 14. Examples of each of these capabilities are described in greater detail below with reference to FIGS. 2-6.

The IP-address matcher 10 may be implemented in hardware, software, or a combination thereof. In some embodiments, the IP-address matcher 10 may be implemented with one or more properly programmed examples of a computer system described below with reference to FIG. 9. The IP-address matcher 10 may be implemented as a single physical computing device, such as a single server, or a single virtual machine executed by a single computing device or multiple computing devices, either of which may be operating other virtual machines. In some embodiments, the IP-address matcher 10 may be implemented as multiple computing devices, for example a distributed computing system having multiple computing devices connected to one another over a network and being either co-located or remote from one another, for example as in data center or a virtualized data center.

Similarly, the client devices 14, 16, 18, 20, and 22 may also be multiple or single physical or virtual computing devices each accessible over the Internet 12 through an IPv4 address, an IPv6 address, or both an IPv4 address and an IPv6 address. For example, the client devices 14, 16, 18, 20, and 22 may each be one or more examples of the computing device described below with reference to FIG. 9, such as smart phones, tablet computers, laptops, desktops, servers, virtual machines, and the like.

An IP address, e.g., an IPv4 address or an IPv6 address, is said to be "an address of" a client device 14, 16, 18, 20, or 22 if communications with that client device 14, 16, 18, 20, or 22 exits or enters the public Internet through that address, notwithstanding a different private Internet Protocol address may be assigned to those client devices 14, 16, 18, 20, or 22 to identify those devices on a local area network shielded from the public Internet. For instance, client devices 14 and 16 may be assigned local IP addresses on a local area network, and communicate with other devices on the Internet 12 via a network address translator 26. The network address translator 26 is assigned a unique IP address on the Internet 12, and all communications between client devices 14 and 16 and devices on Internet 12 use the IP address assigned to network address translator 26. Network address translator 26 translates communications between client devices 14 and 16 and devices on Internet 12 by translating the IP address associated with such communications between its IP address on Internet 12 and the local IP address of client devices 12 and 14 on the local area network.

Communications through the Internet 12, as noted above, generally occur according to a version of the Internet Protocol, such as IPv4 or IPv6. Data transmitted over the Internet is formatted in data packets, each of which includes a packet header having various data relevant to the transmission of the packet over the Internet 12. For example, the header includes a source Internet Protocol address and a destination Internet Protocol address, and intermediary devices within the Internet 12 may route packets from the computing device having the source address to the computing device having the destination address using this header information. IPv4 data packets have a 32-bit IPv4 address value, often expressed as an integer, such as 173.194.64.103, and IPv6 data packets have a 128-bit IPv6 address value, often expressed in hexadecimal, such as 2001:4860:c003::68. When the least significant bits of an IPv6 address are zero, they are often omitted. Thus, an IPv6 address of 2001:4860:0000::00 is often simply written as 2001:4860. As used herein, the term "the Internet," unless stated otherwise, refers to the public Internet, though communications through the public Internet may also pass through private networks, such as local area networks, wireless networks, cellular networks, or personal area networks, implementing one of the Internet Protocols, e.g., using Internet Protocol addresses reserved for private networks.

Each of the nodes connected to the Internet 12 implements either an IPv4 stack 28, an IPv6 stack 30, or in some instances dual stacks 28 and 30 implementing IPv4 and IPv6, respectively. The Internet Protocol stacks 28 and 30 are respectively capable of processing data, (e.g., application layer and transport layer data) according to versions 4 and 6 of the Internet Protocol. Tasks performed by IP stacks 28 and 30 may include, in transmission mode, segmenting data into packets to be transmitted, forming headers for the packets including source and destination addresses, and appending the headers to the packets; and in reception mode, removing the header information from received packets prior to subsequent processing according to various transport and application layer protocols. In some embodiments, the Internet Protocol stacks 28 and 30 may also be capable of processing the communicated data according to a link layer protocol, for example Ethernet, which may include packaging the Internet Protocol packets into frames having a frame header and a frame suffix, and/or processing the communicated data according to a transport layer protocol, such as transmission control protocol (TCP). In some instances, the Internet Protocol stacks 28 and 30 may be implemented partially or entirely with software stored in memory and executed by a central processing unit of a client device or partially or entirely with software or hardware of a network interface card, for example a network interface card capable of performing TCP/IP offload.

As noted above, client devices 14 and 20 may be dual stack client devices having both an IPv4 stack 28 and an IPv6 stack 30. These client devices 14 and 20 are capable of communicating via the Internet 12 using either IPv4 or IPv6, and are therefore assigned both an IPv4 address and an IPv6 address on the Internet 12. Presently, dual stack computing devices such as client devices 14 and 20 (each having the appropriate hardware, software, and assigned IPv4 and IPv6 addresses) constitute a relatively small portion of the computing devices of the Internet (e.g., less than one percent). However, this portion is expected to increase in the future as adoption of IPv6 proceeds.

The IP-address matcher 10, in some embodiments, includes an IPv4 stack 28, an IPv6 stack 30, an IPv4 probe 32, an IPv6 probe 34, a client matcher 36 and a link datastore 38. As noted above, the IP-address matcher 10 can identify client devices that are assigned both IPv4 and IPv6 addresses by exchanging both IPv4 and IPv6 data packets with the client devices. The components of the IP-address matcher 10, described below, are illustrated as discrete functional blocks. These components, like the components illustrated in the other block diagrams herein, may be implemented in hardware or software or a combination thereof and may be implemented as separate hardware or software components. In addition, hardware or software providing the described functionality may be intermingled or otherwise differently organized relative to the way in which the functional blocks are depicted, for example as a single process executing on a single core of a processor. Further, the components of the IP-address matcher 10 and the other block diagrams herein may communicate with one another through a variety of techniques and at various levels of abstraction depending on the configuration. For example, the components may communicate with one another through a shared memory space of a single computing device, a shared memory allocation of a single process or multiple processes executing on a memory device, through values passed by reference or by copy between functions or software modules, or as signals transmitted over a bus or a network, such as a local area network, or the Internet 12.

The Internet Protocol stacks 28 and 30 of the IP-address matcher 10, like the other components of the IP-address matcher 10, may be implemented in the same computing device or different computing devices, depending on the embodiment. For example, some embodiments may have an IPv4 stack and an IPv4 probe 32 in a different computing device from the IPv6 stack 30 and the IPv6 probe 34, and each of these computing devices may be different from a computing device implementing the client matcher 36 and the link datastore 38. Or in some embodiments, each of these components may be implemented in a single computing device.

In some embodiments, the IPv4 probe 32 and the IPv6 probe 34 may be application layer probes capable of transmitting application layer data to or receiving application layer data from one of the client devices 14, 16, 18, 20, or 22 through Internet Protocol stacks 28 or 30, which respectively process the data according to their respective Internet Protocol versions. The IP probes 32 and 34 may also be capable of obtaining the appropriate IP version addresses of the client devices with which they are communicating. For example, the IPv4 probe 32 may be capable of directing the IPv4 stack 28 to transmit application layer data to the client device 14 and storing in memory of the IPv4 probe 32 both the destination IPv4 address and a unique identifier associated with a resource included in the transmission to the destination IPv4 address, examples of which are described below with reference to FIGS. 2 through 6. Similarly, the IPv6 probe 34 may be capable of directing the IPv6 stack 30 to transmit data to the client device 14 and storing in memory of the IPv6 probe 34 the destination IPv6 address and a unique identifier associated with a resource included in the transmission to the destination IPv6 address, again examples of which are described below with reference to FIGS. 2 through 6.

Similarly, in some embodiments, the probes 32 and 34 may be application layer probes capable of receiving application layer data through the respective Internet protocol stacks 28 and 30. For example, the IPv4 probe 32 may be capable of receiving application layer data through the IPv4 stack 28 of the IP-address matcher 10 and obtaining, either itself or from the IPv4 stack 28, the source IPv4 address from which the received data was transmitted through the Internet 12. Based on the received application layer data, which may include a request for a uniquely identified resource, the IPv4 probe 32 may also obtain a unique identifier for the uniquely identified resource, and associate the obtained unique identifier with the obtained source IPv4 address in memory of the IPv4 probe 32. In another example, the IPv6 probe 34 may be capable of receiving application layer data through the IPv6 stack 30 of the IP-address matcher 10 and obtaining, either itself or from the IPv6 stack 30, the source IPv6 address from which the received data was transmitted through the Internet 12. Moreover, based on the received application layer data, which may include a request for a uniquely identified resource, the IPv6 application layer probe 34 may also obtain a unique identifier for the uniquely identified resource, and associate the unique identifier with the obtained source IPv6 address in memory of the IPv6 probe 34. Examples of such unique identifiers and uniquely identified resources are described in greater detail below with reference to FIGS. 2 through 6.

In some embodiments, the IPv4 probe 32 may be an application layer probe capable of transmitting application layer data using IPv4 protocol to a client device having a destination IPv4 address in the fashion described above, and the IPv6 probe 34 may be an application layer probe capable of receiving application layer data sent via IPv6 protocol from a client device having an IPv6 source address in the fashion described above. For example, IPv4 probe 32 may transmit application layer data, including a link to a uniquely identified IPv6 resource, to a client device 14 having a destination IPv4 address, and may store in memory of the IPv4 probe 32 the IPv4 destination address of client device 14 and a first unique identifier for the uniquely identified IPv6 resource. Similarly, IPv6 probe 34 may receive application layer data from client device 14, sent using IPv6 protocol and including an IPv6 source address for client device 14. The application layer data may include a request for a uniquely identified IPv6 resource, and the IPv6 probe 34 may store the received source IPv6 address of client device 14 along with a second identifier for the uniquely identified IPv6 resource. As described in greater detail below, by comparing these first and second unique identifiers, IP address matcher 10 may determine that client device 14 received via its IPv4 address the application layer data sent from IPv4 probe 32, including the uniquely identified link to the IPv6 resource, and subsequently sent via its IPv6 address, application layer data to IPv6 probe 36 requesting the uniquely identified IPv6 resource. Consequently, IP address matcher 10 may store an association between the IPv4 and IPv6 addresses assigned to client device 14.

In some embodiments, the IPv6 probe 34 may be an application layer probe capable of transmitting application layer data using IPv6 protocol to a client device having a destination IPv6 address in the fashion described above, and the IPv4 probe 32 may be an application layer probe capable of receiving application layer data sent via IPv4 protocol from a client device having an IPv4 source address in the fashion described above. For example, IPv6 probe 34 may transmit application layer data, including a link to a uniquely identified IPv4 resource, to a client device 14 having a destination IPv6 address, and may store in memory of the IPv6 probe 34 the destination IPv6 address of the client device 14 and a first unique identifier for the uniquely identified IPv4 resource. Similarly, IPv4 probe 32 may receive application layer data from a client device 14, sent using IPv4 protocol and including an IPv4 source address for the client device 14. The application layer data may include a request for a uniquely identified IPv4 resource, and the IPv4 probe 32 may store the received source IPv4 address of client device 14 along with a second identifier for the uniquely identified IPv4 resource. As described in greater detail below, by comparing these first and second identifiers, IP address matcher 10 may determine that client device 14 received via its IPv6 address the application layer data sent from IPv6 probe 32, including the uniquely identified link to the IPv4 resource, and subsequently sent via its IPv4 address, application layer data to IPv4 probe 32 requesting the uniquely identified IPv4 resource. Consequently, IP address matcher 10 may store an association between the IPv4 and IPv6 addresses assigned to client device 14.

As noted above, the IPv4 and IPv6 probes 32 and 34 may be application layer probes capable of communicating with corresponding application layers executed by the client devices 14, 16, 18, 20, and 22. Examples of such application layers include hypertext transfer protocol (HTTP), hypertext transfer protocol secure (HTTPS), SPDY protocol, file transfer protocol (FTP), VOIP protocols (for instance H.323), or protocols specific to gaming networks. In some embodiments, one probe (e.g., IPv4 probe 32) may be communicating with client devices 14, 16, 18, 20 and 22 via a different application layer than the other application layer probe (e.g., IPv6 probe 34). For example, IPv4 probe 32 may be communicating with the client devices according to HTTP, and IPv6 probe 34 may be communicating with the client devices according to SPDY. Thus, IPv4 probe 32 may transmit HTTP application layer data to the client devices, including an embedded and uniquely identified IPv6 link to an SPDY resource, and the client devices may subsequently request via SPDY application layer data, the uniquely identified IPv6 link from IPv6 probe 32.

In some embodiments, one or both of the application layer probes 32 and 34 is capable of provoking the client devices to transmit an Internet Protocol addressed signal back to the IP-address matcher 10. For example, in some embodiments the IPv4 probe 32 is capable of transmitting instructions to the client devices 14 and 20 instructing the client devices to transmit an IPv6 addressed signal back to the IP-address matcher 10, and this signal may be received by the IPv6 probe 34, as described above. In some embodiments, the IPv6 probe 34 is capable of transmitting instructions to the client devices 14 and 20 instructing the client devices to transmit an IPv4 address signal back to the IP-address matcher 10, and this signal may be received by the IPv4 probe 32, as described above.

In some embodiments, the instructions causing the client devices to transmit IPv4 or IPv6 signals may be instructions encoded in a hypertext transport markup language (HTML) that instruct a browser executed by a client device to request additional content reachable through an IPv6 address, or instructions encoded in HTML that instruct the client device to request additional content reachable through an IPv4 address. Some embodiments may be capable of causing the client devices to transmit these signals automatically, e.g., without requiring the user to manually approve the transmission.

In some embodiments, the IPv4 probe 32 or the IPv6 probe 34 may be, alternatively or additionally, a probe capable of communicating at a different level of a communications stack from the application layer. For example, the IPv4 probe 32 may be a transport layer probe, such as a transmission control protocol (TCP) probe or a user datagram protocol (UDP) probe, capable of transmitting data according to a transport layer protocol. Similarly, in some embodiments, the IPv4 probe 32 may be a transport layer probe capable of receiving data transmitted from a source IPv4 address according to a transport layer protocol. The IPv6 probe 34, depending on the embodiment, may have similar capabilities for IPv6 encoded transport layer data. In some embodiments, both probes 32 and 34 may be transport layer probes, or one probe may be a transport layer probe and the other probe may be an application layer probe or a probe for communicating at some other layer of a communications stack.

The client matcher 36, in some embodiments, may be capable of obtaining from the IPv4 probe 32 and the IPv6 probe 34 pairs of Internet Protocol addresses and unique resource identifiers associated with those IP addresses. The client matcher 36 may be able to correlate an IPv4 address with an IPv6 address when both the IPv4 address and IPv6 address are associated with the same unique resource identifier. For example, the client matcher 36 may receive from the IPv4 probe 32 an IPv4 address of a client device with which the IP-address matcher 10 has communicated (for example transmitted data to, or received data from) and a first unique resource identifier associated with the communication. The client matcher 36 may also receive from the IPv6 probe 34 an IPv6 address of a client device with which the IP-address matcher 10 has communicated and a second unique resource identifier associated with this communication. By matching the first and second unique resource identifiers, the client matcher 36 can identify the IPv4 and IPv6 address associated with the matched unique resource identifiers as having been assigned to the a single client device with which both the IPv4 probe 32 and the IPv6 probe 36 were communicating, and store an association between those IPv4 and IPv6 addresses in memory. Further examples of determining associations between IPv4 and IPv6 addresses are described in greater detail below with reference to FIG. 6. By determining that an IPv4 address and an IPv6 address are correlated because they are assigned to the same client device, such as client devices 14 or 20, IPv4-indexed data may be obtained via a correlated IPv6 address or via an IPv6 address that is related to the correlated IPv6 address in an IPv6 address based cluster, as described in greater detail below with reference to FIG. 7.

The correlated IPv4 and IPv6 address pairs may be transmitted to the link datastore 38, which may store at least a portion of the addresses in a format indicating that the addresses are correlated For instance, the link datastore may associate a prefix of an IPv4 address with a prefix of a correlated IPv6 address, where the respective prefixes are sufficient to identify the IPv4 cluster to which the IPv4 address belongs and the IPv6 cluster to which the correlated IPv6 address belongs. In some embodiments, the link datastore 38 may associate an entire IPv4 address with a prefix or an entire IPv6 address or vice versa.

The link datastore 38 may be capable of retrieving and communicating these correlated IPv4 and IPv6 address pairs, or IPv4 and IPv6 address clusters, with other computing devices, such as the system described below with reference to FIG. 7. For example, the link datastore 38 may store the correlated IPv4 and IPv6 address pairs or correlated IPv4 and IPv6 address clusters as entries of an array, and in some embodiments, each address or address cluster pair may be stored more than once in the array, for example at a location corresponding to a hash value of one of the IP addresses in the correlated IP address pairs and at a location corresponding to a hash value for the other IP address in the correlated IP address pairs. In another example, the correlated IP address pairs may be stored in one or more arrays with the correlated IP address pairs arranged in order according to the IPv4 address or the IPv6 address. In another example, the correlated IP address pairs may be stored in one or more trie data structures, such as a binary search trie or a prefix trie within which nodes are organized according to IPv4 address or IPv6 address. Storing the data in key value pairs or sorted lists is expected to expedite access to the data, as particular values may be accessed without iterating over potentially the entire data structure. In some embodiments, the link datastore 38 may be capable of forming and updating these data structures and receiving and responding to queries for an IPv6 address matched to an IPv4 address or vice versa.

The correlated IP addresses or IP address clusters (and other associated data herein) may be associated with one another through a variety of different techniques. For example, the correlated IP addresses or IP address clusters may be associated with one another by storing them in the same row of a table of a relational database, in entries in different tables linked by key values, in entries of the same document, as attributes of an object in an object oriented programming environment, as values having similar time-stamps, or with a number of other techniques by which different values may be correlated with one another, either in a one-to-one relationship, a one-to-many relationship, or a many-to-many relationship, depending on the embodiment. The associations may be stored in memory, for example a tangible machine-readable non-transitory memory of the link datastore 38, such as random-access memory, a hard disk drive, a solid-state drive, an optical memory disc, or some other form of memory.

Figure 2:
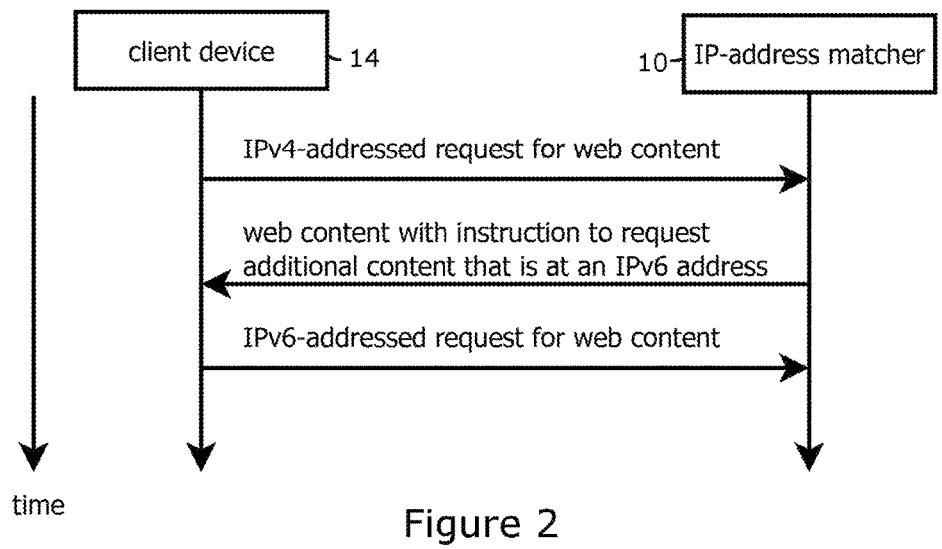
FIGS. 2-5 are signal diagrams showing embodiments of processes for matching an IPv4 address with an IPv6 address of the same client device.

FIG. 2 is an example of a process for obtaining a correlation between a pair of IPv4 and IPv6 addresses, the correlation indicating that the IPv4 and IPv6 addresses are assigned to the same client device. As shown in FIG. 2, the process begins with the client device 14 transmitting an IPv4-addressed request for web content to the IPv4 address of the IP-address matcher 10. The request for web content may be a request for an entire webpage or for content embedded within a webpage, such as a request for an advertisement, a request for an image linking to a social network, or a request for instructions to be executed by the client device 14, e.g., a request for a JavaScript plug-in. In some embodiments, the request may be a request from a web browser of the client device 14. In some embodiments, the request may be a request for content other than web content from an application other than a browser executed by the client device 14. For example, the request may be for a document submitted by an ftp application on client device 14. The request may be encoded according to IPv4 protocol by the client device 14, and conveyed in IPv4 data packets having a header identifying the IPv4 address of the client device 14 as the source address and the IPv4 address of the IP-address matcher 10 as the destination address.

The IP-address matcher 10 may receive the request for web content and may parse the source IPv4 address of the client device 14 from the IPv4 packets conveying the request. This source address may be stored in memory of the IP-address matcher 10 and associated with a unique identifier identifying a resource available from the IP-address matcher via the IPv6 protocol. The unique identifier may be generated by the IP-address catcher 10 when the request for web content from the client device 14 is received, and the IP-address catcher may store the IPv4 source address of client device 14 together with the unique identifier in memory of the IP-address matcher 10.

Next, the IP-address matcher 10 may transmit to the client device 14 the requested web content. The web content may include an instruction that causes the client device 14 to request additional content from the IP-address matcher 10, where the additional content is available at an IPv6 address of the IP-address matcher 10, and includes a reference to the unique identifier generated by the IP-address matcher 10 and associated with the IPv4 address of the client device 14. For example, a webpage or other web content transmitted to the client device 14 may include an image tag, such as <IMG src="www.domainname-resolving-to-IPv6.com/uniqueid- .gif"/>," that when rendered by a browser of the client device 14 causes the client device 14 to request the uniquely identified image identified by the tag. The image tag may instruct the client device to request the uniquely identified image from a domain that resolves to an IPv6 address assigned to the IP-address matcher 10. For example when the client devices transmits a request to a domain name service to identify the Internet Protocol address associated with the domain name "www.domainname-resolving-to-IPv6.com," the domain name service may return the IPv6 address assigned to the IP-address matcher 10. In some embodiments, the domain name service may be bypassed, and the location of the content may be identified by explicitly expressing the IPv6 address of the IP-address matcher 10 within the image tag. In some embodiments, the client device 14 may be instructed to request other types of uniquely identified content, such as uniquely identified HTML, JavaScript, fonts, videos, and the like. Additionally or alternatively, in some embodiments the client device may be instructed to transmit an IPv6 addressed signal having some other purpose, for example conveying data to the IP-address matcher 10 as described below with reference to FIG. 5.

As indicated above, the client device 14 may be instructed to request uniquely identified content from the IP-address matcher 10, such as the uniquely named image file "uniqueid.gif.". The unique identifier, in some embodiments, may be a generally unique identifier, for example a value incremented or decremented with a counter of the IP-address matcher 10 upon each interaction with a client device. In some embodiments, the unique identifier may be a pseudorandom value, such as a pseudorandom value generated with a linear shift register or a random value generator of the IP-address matcher 10. In another example, the additional content the client device is instructed to obtain may be named based on the IPv4 address of the client device, for example by including the IPv4 address of the client device in the name of the image file requested. In one example, the uniqueness of the unique identifier is only valid over a limited period of time. Thus, values for the unique identifiers can be reused after lapse of the period of time, for example after a lapse of several hours.

When the client device 14 requests the uniquely named content from the IPv6 address of IP-address matcher 10, it does so via data packets that are formatted according to the IPv6 protocol. These IPv6 formatted data packets include headers where the source address refers to the IPv6 address of the client device 14, and the destination address refers to the IPv6 address of the IP-address matcher 10. Upon receiving the IPv6 addressed request from client device 14, the IP-address matcher can parse the IPv6 source address of the client device 14 from the packets conveying the request, as well as the unique identifier of the requested uniquely identified content. As described in greater detail below with reference to FIG. 6, the IP-address matcher 10 may correlate the IPv4 address of the client device 14 from which the request for the web content was received with the IPv6 address of the client device 14 from which the request for the additional uniquely identified resource was received based on the unique identifier associated with both the IPv4 address and the IPv6 of client device 14.

Client devices that are not dual stack, such as client devices 16, 18, and 22, of FIG. 1 may fail to retrieve the additional uniquely identified content that is only reachable at an IPv6 address. The instructions to request additional uniquely identified content may be transmitted from the IP-address matcher 10 without regard to whether the receiving client device is a dual stack client device. If the receiving client device is not a dual stack client device, it will be unable to formulate and send a request for the additional uniquely identified content, and IP-address matcher 10 will be unable to correlated the IPv4 address assigned to the client device with an IPv6 address. In some embodiments, the additional uniquely identified content requested by the client device may be semantically irrelevant to a user viewing the web content requested in the initial IPv4 address request. For example, a one pixel by one pixel graphics interchange format (GIF) image or a transparent image may be the requested uniquely identified additional web content. Client devices that are not dual stack may fail to execute the instructions to request the additional uniquely identified content from the IPv6 address and may, for example, experience a broken link, which in some implementations may not be apparent to the user of the client device viewing the initially requested web content.

Figure 3:
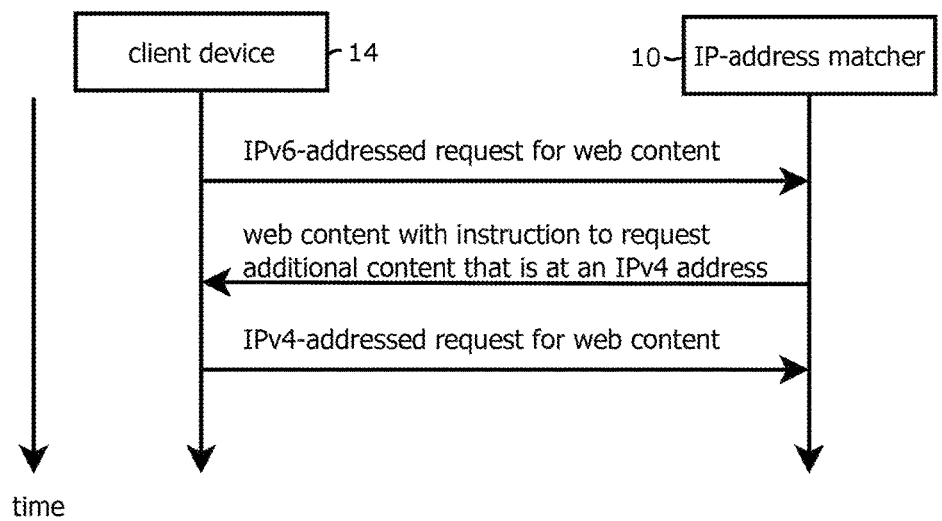

FIG. 3 illustrates another example of a process for obtaining a matching pair of IPv4 and IPv6 addresses assigned to a client device 14. In some embodiments, the roles of IPv4 and IPv6 are reversed relative to those of FIG. 2. The client device 14 initially requests IPv6 addressed web content from the IP-address matcher 10, and the IP-address matcher 10, in response, transmits web content to the client device with instructions to request additional uniquely identified content from an IPv4 address assigned to IP-address matcher 10. Upon rendering the web content, the client device 14 executes the instruction and transmits a request for the uniquely identified web content to an IPv4 address assigned to the IP-address matcher 10. As with the previously described embodiments of FIG. 2, the IPv6 address of client 14, which appears as the source address in the Internet Protocol transmission conveying the initial request for web content to the IP-address matcher 10, may be correlated with the IPv4 address of client 14, which appears as the source address in the request for the additional uniquely identified content from the IP-address matcher 10, based on the association of the unique identifier with the IPv4 and IPv6 source addresses in both requests.

Figure 4:
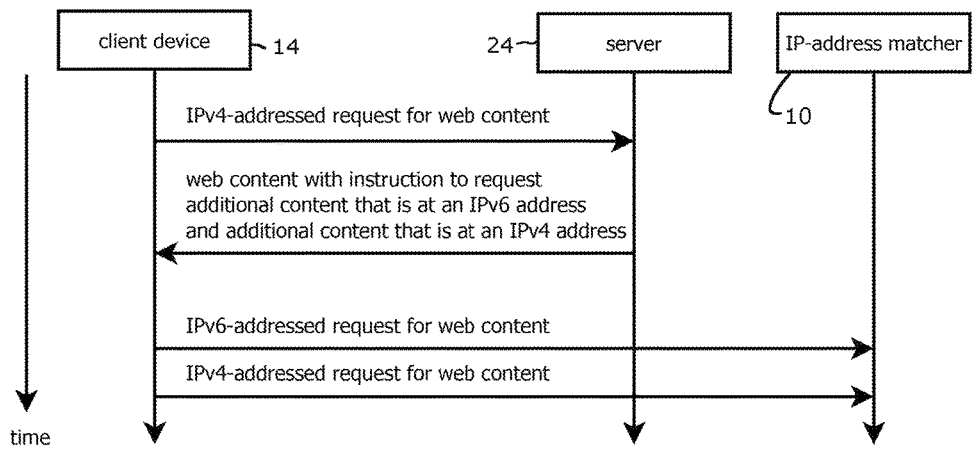

FIG. 4 illustrates another example of a process for obtaining a matching pair of IPv4 and IPv6 addresses of the same client device 14 at an IP-address matcher 10. In some embodiments, the initial request for IPv4 addressed web content is from the client device 14 to the server 24 illustrated in FIG. 1. The server 24 may be a separate physical machine from the IP-address matcher 10, for example a server operated by a different entity than the entity operating the IP-address matcher 10, such as an affiliate of the entity operating the IP-address matcher 10 or customer of an entity operating the IP-address matcher 10.

The server 24 may transmit to the client device 14 the requested web content, in which may be included instructions to request first additional content that is at an IPv6 address of the IP-address matcher 10 and second additional content that is at an IPv4 address of the IP-address matcher 10. Upon rendering the initially requested web content, the client device 14 may execute the instructions within the web content and transmit an IPv6 addressed request for the first additional web content to the IP-address matcher 10 and an IPv4 addressed request for the second additional web content to the IP-address matcher 10. The IPv4 address and the IPv6 address of the client device may be parsed from the source address of IP packets conveying these requests. The requests to the IP-address matcher 10 may include an identifier, for example an identifier embedded in a filename or the requests may be matched to one another based on time, for example the IPv4 addressed request may be matched to the IPv6 addressed request received closest in time to one another. In another example, the server 24 may transmit to the IP-address matcher 10 an identifier associated with the instructions to the client device 14, such as an identifier appearing in a filename of content to be requested by the client device 14 or an identifier stored in a cookie or database of the client device 14 by the server 24 to be retrieved by the IP-address matcher 10.

Figure 5:
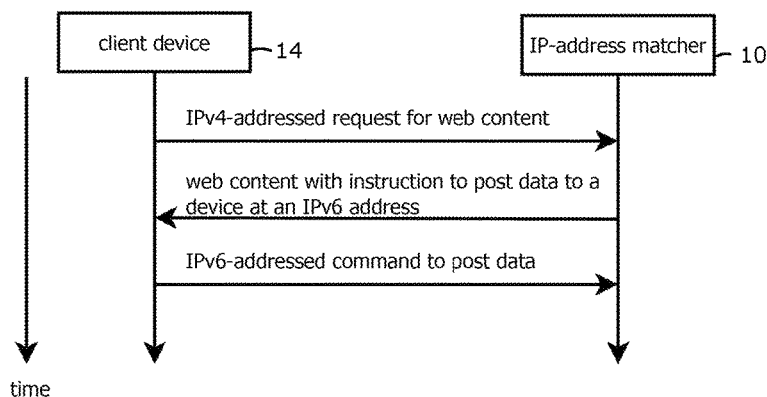

FIG. 5 illustrates another example of a process for obtaining a matched pair of IPv4 and IPv6 addresses of the same client device 14 at an IP-address matcher 10. In this embodiment, the client device 14 transmits an IPv4 address request for web content to the IP-address matcher 10, thereby informing the IP-address matcher 10 of the IPv4 address of the client device 14 in virtue of this address appearing as the source address in the header of IPv4 packets from the client device 14. The IP-address matcher 10, in some embodiments, then in response transmits the requested web content with instructions to post data to a device at an IPv6 address. The instructions may include instructions expressed in a scripting language, such as JavaScript, that cause the client device to transmit a post commands to the IP-address matcher 10 at an IPv6 address of the IP-address matcher 10. The IP-address matcher 10 may receive the data encoding the post command and parse an IPv6 address of the client device 14 from the source field of the header of the Internet Protocol packets conveying the post command. The post command may include an identifier present within the instructions to the client device 14. Based on the IPv4 address of the client device and the receipt of the IPv6 address from which the post command was transmitted, the address matcher may match the IPv4 address of the client device to the IPv6 address of the client device 14.

Figure 6:
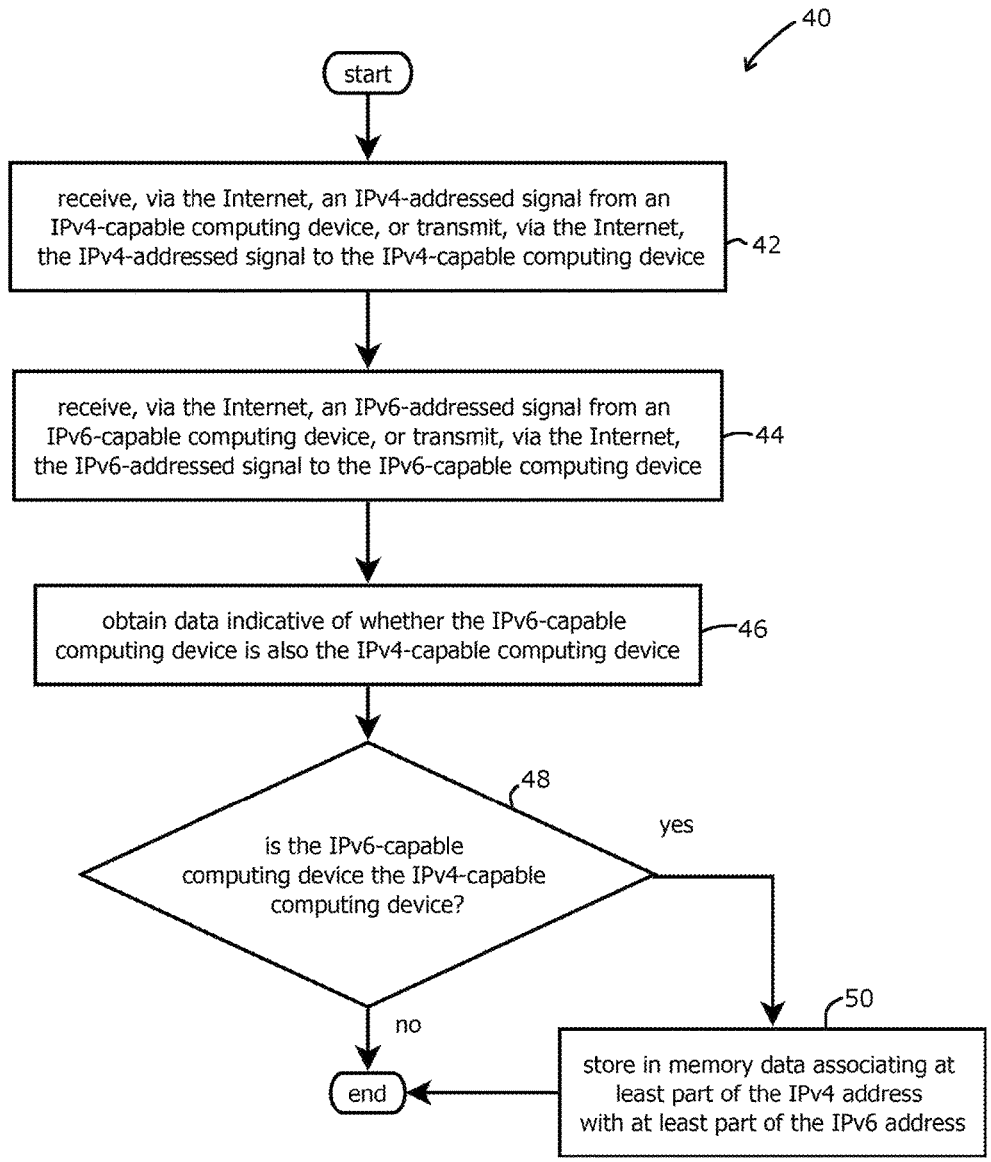
FIG. 6 is a flowchart showing an embodiment of a process for matching an IPv4 address within an IPv6 address of the same client device.

FIG. 6 illustrates an example of a process 40 for correlating IPv4 and IPv6 addresses assigned to the same client device on the Internet. In some embodiments, the steps of the process may be performed by the IP-address matcher 10 described above with reference to FIG. 1. In other embodiments, some or all of the steps may be performed with other devices.

In certain embodiments, the process 40 includes receiving, via the Internet, an IPv4 addressed signal from an IPv4-capable computing device, or transmitting, via the Internet, the IPv4-addressed signal to the IPv4-capable computing device, as indicated by block 42. In some embodiments, the step of block 42 may include only transmitting or only receiving or may include both transmitting and receiving the described signals.

The process 40 may also include, in some embodiments, receiving, via the Internet, an IPv6-addressed signal from an IPv6-capable computing device, or transmitting, via the Internet, the IPv6-addressed signal to the IPv6-capable computing device, as indicated by block 44. As with the previous step, some embodiments may only receive, only transmit, or both receive and transmit the described signal. Further, as is the case with the other flow charts and signal diagrams described herein, embodiments are not limited to the sequence illustrated. For example, some embodiments may perform the step of block 42 after the step of block 44, which is not to suggest that any other feature described herein may not also be omitted in some embodiments.

In certain embodiments, the process 40 includes obtaining data indicative of whether the IPv6 capable computing device is also the IPv4 capable computing device, as indicated by block 46. The obtained data may be a variety of different types of data. For example, the obtained data may be an identifier referenced in a request for additional web content received from the client device and associated with the IPv4 address of the client device. In another example, the obtained data may be a timestamp or a difference in time between when step 42 and step 44 occur. In some embodiments, the data obtained may be data that was stored on the client device, for example as a cookie or as an entry in a database, during one of steps 42 and 44 and is retrieved from the client device during another of the steps 42 and 44, for example by reading the cookie or querying the database. In some embodiments, the obtained data may be data indicative of a configuration of the client device, such as a browser and browser version operated by the client device.

The process 40 may also include determining whether the IPv6-capable computing device is also the IPv4-capable computing device, as indicated by block 48. This determination may be based on the data obtained in step 46, in some embodiments. For example, upon receiving a request for web content named with a unique identifier or generally unique identifier at an IPv6 address, the process 40 may include searching a list of identifiers each associated with an IPv4 address to which web content was previously transmitted and identifying an IPv4 address associated with a matching identifier. The IPv6 address, in response, may be associated with the IPv4 address having the matching identifier, in some embodiments. In another example, upon receiving an IPv6 address, it may be determined whether an IPv4 addressed communication occurred within some time threshold, for example within 100 ms or less. Upon determining that the difference in time between an IPv4 and an IPv6 communications is less than the threshold time, it may be determined that the IPv6-capable computing device is the same computing device as the IPv4-capable computing device. Some embodiments may make this determination based on a combination of the various types of obtained data described above. For example, the timestamps and browser versions may be combined to determine whether the IPv6 address is of the same computing device as the IPv4 address.

In some embodiments, upon determining that the IPv6-capable computing device is the IPv4-capable computing device, process 40 may proceed to store in memory data associating at least part of the IPv4 address with at least part of the IPv6 address, as indicated by block 50. In some embodiments, associating may include storing data in memory indicating a correlation between some or all of the Internet addresses. Alternatively, upon determining that the IPv6-capable computing device is not the IPv4-capable computing device, in response, the process 40 may end.

In some embodiments, the process 40 may yield a collection of matched IPv4 and IPv6 address pairs, each pair being an Internet Protocol address of a dual stack client device. These matched pairs, in some embodiments, may have a variety of uses, some of which are described below with reference to FIGS. 7 and 8.

Figure 7:
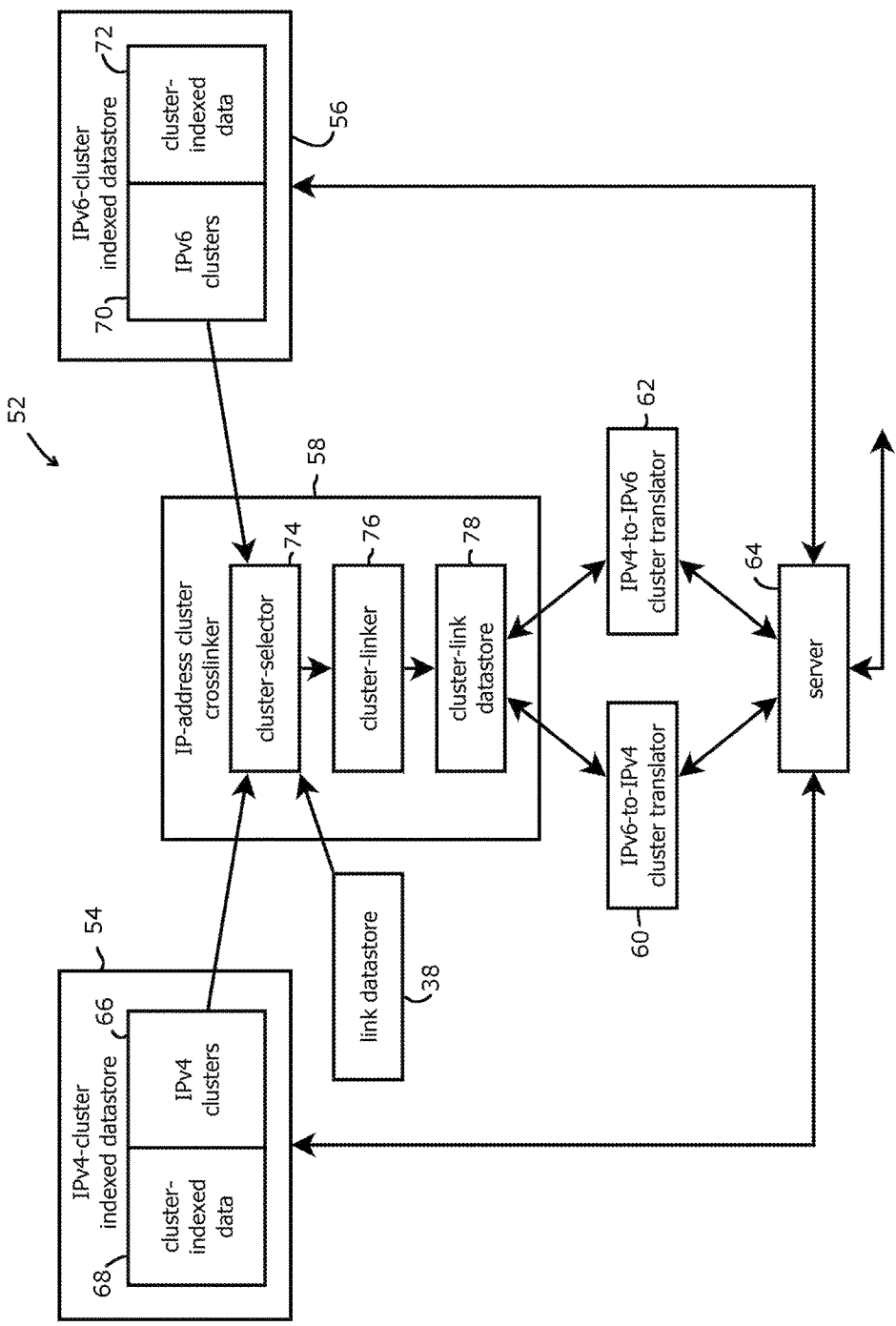
FIG. 7 is a block diagram showing an embodiment of a system that accesses IPv4-indexed data based on an IPv6 address and vice versa.

FIG. 7 shows an embodiment of a system 52 capable of accessing IPv4-address indexed data based on an IPv6 address. The system 52 may also be capable of accessing IPv6-address indexed data based on an IPv4 address. In some embodiments, the system 52 may have one of these capabilities but not the other, which is not to suggest that any other embodiment described herein requires all the features described. The system 52 may include a copy of the link datastore 38 described above with reference to FIG. 1 or may be in communication with the link datastore 38 of FIG. 1. Some embodiments of the system 52 may be capable of correlating clusters of IPv4 addresses with clusters of IPv6 addresses based on correlated IPv4 and IPv6 address pairs stored by the link datastore 38. For example, as described in greater detail below with reference to FIG. 8, the system 52 may be capable of linking a cluster of IPv6 addresses with a cluster of IPv4 addresses by querying the link datastore 38 for correlated pairs of IPv4 and IPv6 addresses. Based on the correlation between IPv4 and IPv6 addresses or address clusters, the system 52 may retrieve IPv4-indexed data based on an IPv6 address and vice versa.

The illustrated system 52, in some embodiments, includes an IPv4-cluster indexed datastore 54, an IPv6-cluster indexed datastore 56, an IP-address cluster crosslinker 58, an IPv6-to-IPv4 cluster translator 60, an IPv4-to-IPv6 cluster translator 62, and a server 64.

In some embodiments, the IPv4-cluster indexed datastore 54 includes IPv4 clusters 66 and IPv4 cluster-indexed data 68. The IPv4 clusters may be clusters of one or more IPv4 addresses assigned to devices having similar or identical attributes. For example, the IPv4 clusters may be clusters of IPv4 addresses assigned to client devices located within the same geographic area. The clusters may be based on IP address assigned to client devices sharing one or more common attributes of varying ranges of specificity, or granularity. For example, the clusters may be based on IP addresses assigned to client devices associated with the same businesses, city blocks, zip codes, counties, cities, metropolitan areas, states, countries, or continents. The clusters may be obtained with a variety of techniques. For example, clusters may be formed based on network equipment through which Internet Traffic addressed to members of the cluster are routed. For example, the network equipment may be named according to a geographic region likely to be relatively near computing devices assigned IP addresses in the cluster, or may produce similar latency signals to or from such equipment. In another example, IP addresses may be clustered based on data communicated from devices assigned to those IP addresses, for example based on search queries from those devices requesting information about a geographic area, such as a search for "Pizza in New York City," which may indicate that the device from which the request was received is located in the City of New York. In some examples, IP address clusters may be formed based on information contained in user profiles (e.g., home addresses) entered by users via devices assigned IP addresses in the cluster. In another example, the clusters may be formed by grouping IPv4 addresses assigned by an Internet service provider to its customers in a geographic area. The clusters may be based on a variety of different attributes. For example, the clusters may be based on geographic area, based on user interests, or based on other factors. Clusters may include a generally continuous ranges of consecutive IP addresses, or the clusters may include a list of generally non-consecutive IP addresses.

The cluster indexed data 68 may be a variety of different types of data. For example, the cluster indexed data 68 may be the attribute by which the IPv4 clusters are grouped. In some embodiments, the cluster indexed data may be the geographic area in which client devices assigned the IPv4 addresses in the cluster are located. In this way, client devices assigned only IPv6 addresses may be geolocated using IPv4 cluster indexed data that maps IPv4 address clusters to locations. For example, when a request is received from a client device having an IPv6 address, the IPv6 address can be used to determine an IPv6 address cluster and an IPv4 address cluster to which it is correlated. The correlated IPv4 address cluster can then be used to determine a location for the device using the IPv4 cluster indexed data.

The cluster indexed data 68 may be addressable via an IPv4 address. For example, the IPv4-cluster indexed datastore 54 may be capable of receiving, for example from the server 64, an IPv4 address identifying one or more clusters in which that address is a member, and retrieving cluster index data associated with each of those clusters. For example, a given IPv4 address may be a member of a cluster of Internet addresses associated with devices located in the borough of Manhattan, a cluster of Internet addresses associated with devices located in the city of New York, a cluster of Internet addresses associated with devices located in the state of New York, a cluster of Internet addresses associated with devices located in the United States, and a cluster of Internet addresses associated with devices located in North America. The IPv4-cluster indexed datastore 54 may be capable of retrieving the cluster indexed data associated with each of these clusters and, in some embodiments, selecting among or ranking the retrieved cluster indexed data. For instance, selecting an IP address cluster associated with a zip code rather than North America in the preceding example. In another example, the IPv4-cluster indexed datastore 54 may select among the responsive cluster indexed data based on confidence data indicative of the likelihood that the cluster indexed data accurately describes an attribute of a device having an assigned IP address in the cluster, such as the likelihood that a device having an IPv4 address in the cluster is located within a particular zip code. Or data may be retrieved based on an IPv4 cluster identified by the server 64.

In some embodiments, the IPv6-cluster indexed datastore 72 includes IPv6 clusters 70 and cluster-indexed data 72 that is indexed according to the IPv6 clusters 70. The IPv6-cluster indexed datastore 56 may operate in a manner similar or identical to that of the IPv4-cluster indexed datastore 54 described above with the substitution of IPv6 addresses for IPv4 addresses. In some embodiments, the IPv6-cluster indexed datastore 56 may be omitted, which is not to suggest that other features described herein may not also be omitted in some embodiments.

In some embodiments, the IP-address cluster crosslinker 58 may include a cluster selector 74, a cluster linker 76, and a cluster-link datastore 78. The IP-address cluster crosslinker 58 may be capable of correlating IPv4 clusters with IPv6 clusters based on correlated pairs of IPv4 addresses and IPv6 addresses obtained, e.g., from the IP-address matcher 10 and stored in the link datastore 38. This aspect of the operation of the IP-address cluster crosslinker 58 is described in greater detail below with reference to FIG. 8.

The illustrated cluster selector 74, in some embodiments, may obtain an IPv4 cluster from the IPv4 clusters 66, and based on IPv4 addresses in the cluster, obtain correlated IPv6 addresses from the link datastore 38. The cluster selector 74 may then obtain one or more IPv6 clusters containing the correlated IPv6 addresses, and link the IPv4 cluster with the one or more IPv6 clusters. Examples of the operation of the cluster selector 74 are described in greater detail below with reference to FIG. 8.

The cluster linker 76 may correlate the obtained IPv4 cluster and one or more of the obtained IPv6 clusters obtained by the cluster selector 74. As described in greater detail below with reference to FIG. 8, the cluster selector may be capable of ranking or scoring the IPv6 clusters and selecting based on the rank or scores one or more of the IPv6 clusters to be associated with the obtained IPv4 cluster.

The cluster-link datastore 78 may receive the selected IPv6 cluster or clusters from the cluster linker 76 and may associate the IPv4 clusters with the IPv6 cluster or clusters in memory. The association may be expressed in a variety of forms. For example, the data may be stored in the manner described above for expediting access to correlated IPv4 and IPv6 address pairs, e.g., in hash tables, sorted arrays (such as a sorted tuple), binary search tries, or prefix tries. The cluster-link datastore 78 may store the IPv4 cluster, the IPv6 cluster or clusters selected by the cluster linker 76, and data indicating a correlation between the IPv4 cluster and the IPv6 cluster or clusters. In some embodiments, the cluster-link datastore 78 may map IPv6 addresses or IPv6 address clusters to IPv4 addresses or IPv4 address clusters in a composite data structure, such as an associative array having key-value pairs, with IPv6 clusters serving as a key and an IPv4 cluster or clusters serving as the value paired with the key.

The IPv6-to-IPv4 cluster translator 60 may receive queries specifying an IPv6 address from the server 64, and in response, identify an IPv4 cluster or clusters responsive to the query. The responsive IPv4 cluster or clusters may be determined by requesting from the cluster-link-datastore 78 an IPv6 cluster or clusters in which the IPv6 address of the query is a member and selecting an IPv4 cluster or clusters associated with those IPv6 clusters by the cluster linker 76. In some embodiments, the smallest or most specific IPv6 cluster may be selected, and the IPv4 cluster or clusters associated with that smallest IPv6 cluster may be identified as being responsive to the query. The IPv6-to-IPv4 cluster translator 60 may return the IPv4 clusters responsive to the query to server 64. Thus, in some embodiments, the IPv6-to-IPv4 cluster translator 60 may translate an IPv6 address to a correlated IPv4 cluster. The IPv6-to-IPv4 cluster translator 60 may transmit the identified IPv4 cluster or clusters to the server 64, which may request cluster-indexed data 68 from the IPv4-cluster indexed datastore 54 based on the returned IPv4 cluster or clusters.

The system 52 may also be capable of performing the above-described operations with the roles of IPv4 and IPv6 addresses reversed. For instance, the cluster-link datastore 78 may be capable of responding to queries from the IPv4-to-IPv6 cluster translator 62 with an IPv6 cluster or clusters responsive to a given query based on an IPv4 address. And the server 64 may retrieve IPv6-cluster indexed data from the datastore 56 based on the query result.

The cluster-link datastore 78 may be populated and updated periodically, for example during a periodic indexing operation performed hourly, daily, weekly, or monthly. For example, additional data gathered within the link datastore 38 may be used periodically to refine the accuracy of the links between IPv6 clusters and IPv4 clusters in the cluster link datastore 78. In other embodiments, the cluster-link datastore 78 is updated aperiodically, for instance in response to a change in a number of entries in the link datastore 38 exceeding a threshold. In some embodiments, the cluster-link datastore 78 or a copy of the cluster-link datastore 78 may be updated while the cluster translators 60 and 62 continue to operate, e.g., in parallel.

In some embodiments, the system 52 may be coupled to an IPv6-to-IPv4 index datastore that stores, for each active IPv6 address, a corresponding IPv4 address or IPv4 address cluster or clusters. For example, periodically or aperiodically each active IPv6 address may be transmitted to the IPv6-to-IPv4 cluster translator 60, which may return an IPv4 address or IPv4 address cluster or clusters that is stored in memory of the IPv6-to-IPv4 index datastore. The IPv6-to-IPv4 index datastore may then be queried to return IPv4 address or address clusters mapped to a given IPv6 address without also identify an IPv6 address cluster.

The server 64 may be capable of using the cluster indexed data for a variety of purposes. For example, the server 64 may receive a request for web content, the request identifying a source IPv6 address of an IPv6-capable computing device requesting the content. In response the server 64 may parse the source IPv6 address from a received IP packet header, and the server 64 may then transmit the parsed IPv6 address to the IPv6-to-IPv4 cluster translator 60, which may respond with an IPv4 cluster correlated with the IPv6 address. The server 64 may then retrieve cluster-indexed data 68 from the IPv4-cluster indexed datastore 54 based on the IPv4 cluster returned from the IPv6-to-IPv4 cluster translator 60. In some embodiments, the cluster indexed data may be a geographic area associated with the IPv4 cluster, thereby provided location information about the content requesting device having the IPv6 source address. Based on the geographic area associated with the IPv4 cluster, the server 64 may localize content responsive to the request received from the device assigned the IPv6 source address. For example the server 64 may select a language for the content; may balance a load among other computing devices for serving the content; may rank search results based on proximity to the geographic area; or may select local advertisements to be transmitted to the requesting device assigned the IPv6 source address. The server 64 may have similar capabilities in some embodiments with the roles of IPv4 and IPv6 addresses reversed based on data stored in the IPv6-cluster indexed datastore 56 instead of the IPv4-cluster indexed datastore 54.

Thus, in some embodiments of the system 52 may access IPv4 indexed data based on an IPv6 address of a client device. This functionality is expected to extend the usefulness of IPv4 indexed data to computing devices implementing IPv6 protocols but not IPv4 protocols. Not all embodiments, however, provide this benefit, and other embodiments may provide other benefits, some of which are described herein.

Figure 8:
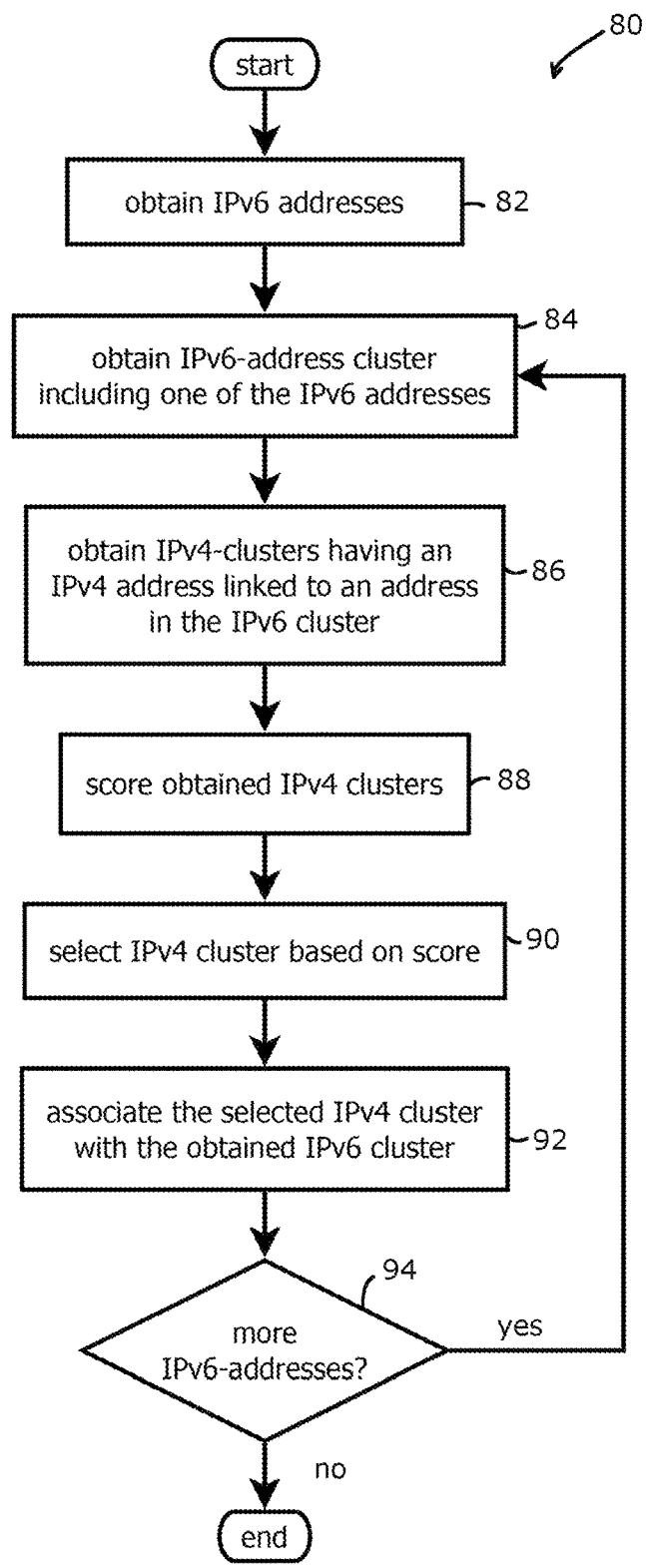
FIG. 8 shows an embodiment of a process for correlating clusters of IPv4 addresses with clusters of IPv6 addresses.

FIG. 8 illustrates an example of a process 80 for correlating IPv6 clusters with IPv4 clusters. In some embodiments, the process 80 may be performed by the IP-address cluster crosslinker 58 of FIG. 7 or the process 80 may be performed by other devices.

The process 80, in some embodiments, includes obtaining IPv6 addresses, as indicated by block 82. Obtaining an IPv6 addresses may include parsing a source addresses from signals received from a plurality of IPv6-capable computing devices.

The process 80 further includes, in some embodiments, identifying an IPv6 address cluster including the obtained IPv6 addresses, as illustrated by block 84. In general, IPv6 clusters may be formed in the same manner discussed above with respect to IPv4 clusters. For example, they can be formed based on similarity of IPv6 addresses, assignment of IPv6 addresses to Internet service providers, similar location based search queries received from a group of IPv6 addresses, names of network nodes through which the traffic to devices assigned the IPv6 addresses passes, and the like.

Next, in some embodiments, the process 80 includes identifying IPv4 clusters containing an IPv4 address that is correlated to an IPv6 address contained within the identified IPv6 cluster, as indicated by block 86. Identifying the IPv4 clusters may include obtaining correlated pairs of IPv6 addresses contained in the identified IPv6 cluster and with IPv4 addresses contained in the identified from the link datastore 38 of FIG. 1. Further, obtaining the IPv4 clusters in step 86 may also include selecting pairs having an IPv6 address within the obtained IPv6 cluster from step 84, and based on the selected pairs, selecting IPv4 clusters within which the IPv4 addresses of the selected pairs is a member. Thus, in some embodiments, IPv4 clusters may be selected based on the matched pairs of addresses from dual stack client devices.

Next, as indicated by block 88, the obtained IPv4 clusters may be scored, in some embodiments. The score may be a value indicative of the likelihood of an IPv4 cluster being associated with data relevant to an IPv6 cluster. The score may be based on the specificity of the data, e.g., a smaller versus larger geographic area, (with greater specificity tending to increase the score) and based on the strength of the correlation between the IPv4 clusters and the IPv6 cluster, e.g., based on a number or ratio of matched pairs linking the IPv4 cluster to an IPv6 cluster (with more matched pairs tending to increase the score). Scoring the clusters may include ranking the clusters based on a variety of attributes.

Next, as indicated by block 90, an IPv4 cluster may be selected based on the score. In some embodiments, multiple clusters may be selected, for example clusters having a score above a threshold. Or some embodiments may include selecting the highest scoring IPv4 cluster.

Next, as indicated by block 92, the selected IPv4 cluster may be associated with the obtained IPv6 cluster, in some embodiments. The clusters may be associated by storing in memory data indicating a correlation between the IPv4 cluster and the IPv6 cluster. In some embodiments, the association may be performed by the cluster-link data stored 78 as described above.

Next, in some embodiments, the process 80 includes determining whether there are more IPv6 addresses, as indicated by block 94. Upon determining that there are more IPv6 addresses, the process may return to block 84 in response, and additional IPv6 clusters may be obtained and associated with IPv4 clusters. Upon determining that there are no more IPv6 addresses the process, the process 80 may end.

The process 80 may result in a group of IPv6 clusters each being correlated with an IPv4 cluster. Based on the correlations, IPv4-indexed data may be accessed to support an IPv6-capable computing device, and the useful life of IPv4 indexed data may be extended further into the roll-out of IPv6.

Figure 9:
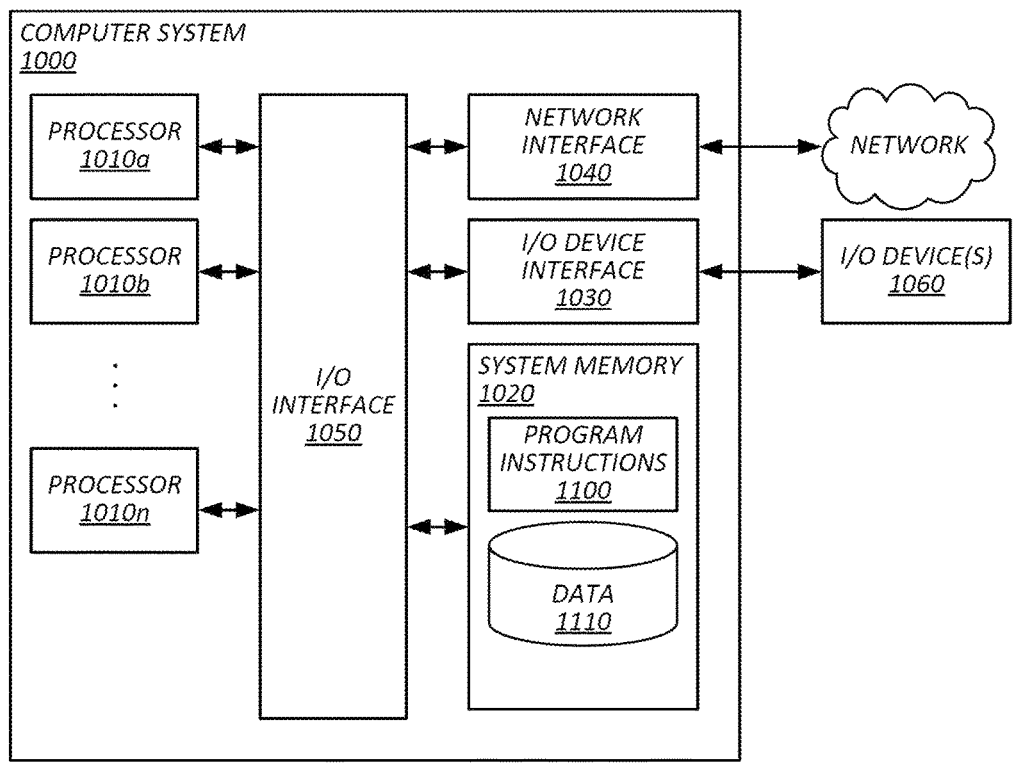
FIG. 9 shows an example of a computer system by which some of the techniques described below may be implemented.

FIG. 9 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030 and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uniprocessor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area (WAN), a cellular communications network or the like.

System memory 1020 may be configured to store program instructions 1100 or data 1110. Program instructions 1100 may be executable by a processor (e.g., one or more of processors 1010*a*-1010*n*) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include, non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). In some embodiments, the program may be conveyed by a propagated signal, such as a carrier wave or digital signal conveying a stream of packets.

I/O interface 1050 may be configured to coordinate I/O traffic between processors 1010a-1010n, system memory 1020, network interface 1040, I/O devices 1060 and/or other peripheral devices. I/O interface 1050 may perform protocol, timing or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000, or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending or storing instructions or data implemented in accordance with the foregoing description upon a computer-accessible medium. Accordingly, the present invention may be practiced with other computer system configurations.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a", "an" and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms relating to causal relationships, e.g., "in response to," "upon," "when," and the like, encompass causal relationships having both causes that are a necessary causal condition and causes that are a sufficient causal condition, e.g., "state X occurs upon condition Y obtaining" is generic to "X occurs solely upon Y" and "X occurs upon Y and Z." Similarly, unless otherwise indicated, statements that one value or action is "based on" another condition or value encompass both instances in which the condition or value is the sole factor and instances in which the condition or value is one factor among a plurality of factors. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing or computing device is capable of manipulating or transforming signals, for instance signals represented as physical electronic, optical, or magnetic quantities within memories, registers, or other information storage devices, transmission devices, or display devices of the special purpose computer or similar special purpose processing or computing device.

What is claimed is:

1. A method, comprising:
    sending, with one or more processors, first information from a first device to a first network protocol address of a second device, wherein the first information is sent in a first communication pursuant to a first networking protocol using a first protocol stack of the first device, and the first information includes a first unique identifier and instructions that, upon execution, cause the second device to send, pursuant to a second networking protocol that is different from the first networking protocol, second information to the first device from a second network protocol address of the second device, the second information including a second unique identifier;
    receiving, with the one or more processors, at the first device, the second information sent from the second device in a second communication;
    comparing, with the one or more processors, the first unique identifier sent to the second device to the second unique identifier received from the second device; and
    in response to the first unique identifier matching the second unique identifier:
        storing, with the one or more processors, in memory, that the first network protocol address of the second device is associated with the second network protocol address of the second device, and
        sending a third communication from the first device to the second network protocol address for the second device, the third communication sent pursuant to the second networking protocol, wherein the first communication sent from the first device pursuant to the first network protocol is sent without use of the second protocol stack of the first device and the third communication sent from the first device pursuant to the second network protocol is sent without use of the first protocol stack of the first device.

2. The method of claim 1, wherein:
    the first networking protocol is Internet Protocol version 4 (IPv4);
    the first network protocol address is an IPv4 address for the second device;
    the second networking protocol is Internet Protocol version 6 (IPv6); and
    the second network protocol address is an IPv6 address for the second device.

3. The method of claim 1, further comprising:
    storing in memory the first unique identifier, the first network address for the second device, and a first timestamp indicating a time the first unique identifier was sent to the second device to create the record before receiving the second information sent from the second device;
    generating a second timestamp indicating a time a request for a resource identified by the second unique identifier was received from the second device;
    using the second unique identifier to retrieve the first timestamp and the first network address from the memory; and
    determining that a time difference between the first timestamp and the second timestamp is less than a threshold period of time.

4. The method of claim 1, further comprising:
    identifying an IPv4 address cluster that includes the first network protocol address; and
    assigning the IPv6 address to an IPv6 address cluster that is associated with the IPv4 address cluster.

5. The method of claim 4, wherein the IPv4 address cluster is a cluster of IPv4 addresses geocoded to a geographic area; and wherein the method further comprises geocoding the IPv6 addresses in the IPv6 address cluster to the same geographic area.

6. The method of claim 1, further comprising:
    identifying a first network protocol address cluster of which the first network protocol address is a member; and
    assigning the second network protocol address to a second network protocol address cluster that is associated with the first network protocol address cluster.

7. The method of claim 1, wherein:
    the first device is a web server;
    the second device is a client device having a web browser, the sending of the first information from the first device being in response to a received request for a web page issued from the web browser and including an IPv4 address of the client device in a source address of a packet header conveying the request;
    the first information sent to the second device includes the requested web page, the web page having an image tag having an address that includes the first unique identifier and an IPv6 address of the web server; and
    the second information sent from the second device pursuant to the second networking protocol includes an IPv6 request containing the name of the image tag and an IPv6 address of the client device in a source address of a packet header.

8. The method of claim 1, wherein the instructions sent from the first device cause the second device to encode the first information including the first unique identifier in an application layer protocol and send the second information including the second unique identifier encoded in the application layer protocol.

9. The method of claim 1, wherein the instructions sent from the first device cause the second device to encode the first information including the first unique identifier in a transport layer protocol and send the second information including the second unique identifier encoded in the transport layer protocol.

10. The method of claim 1, wherein:
    the second device comprises a computer executing a web browser;
    the first device comprises one or more computers remote from the second device;

and the instructions comprise hypertext markup language code that causes a web browser executing on the second device to request a resource having the first unique identifier as part of a name of the resource.

11. The method of claim 1, comprising:

receiving a request for an advertisement from a given IPv6 address;

determining a geolocation based on the given IPv6 address;

selecting an advertisement based on the geolocation; and causing the advertisement to be sent to the given IPv6 address.

12. A system, comprising:

one or more processors;

memory, in communication with the processors and storing instructions that when executed cause the processors to perform operations comprising:

sending first information from a first device to a first network protocol address of a second device, wherein the first information is sent in a first communication pursuant to a first networking protocol using a first protocol stack of the first device, and the first information includes a first unique identifier and instructions that, upon execution, cause the second device to send, pursuant to a second networking protocol that is different from the first networking protocol, second information to the first device from a second network protocol address of the second device, the second information including a second unique identifier;

receiving, at the first device, the second information sent from the second device in a second communication;

comparing, with the one or more processors, the first unique identifier sent to the second device to the second unique identifier received from the second device; and in response to the first unique identifier matching the second unique identifier:

storing, in memory, that the first network protocol address of the second device is associated with the second network protocol address of the second device and sending a third communication from the first device to the second network protocol address for the second device, the third communication sent pursuant to the second networking protocol, wherein the first communication sent from the first device pursuant to the first network protocol is sent without use of the second protocol stack of the first device and the third communication sent from the first device pursuant to the second network protocol is sent without use of the first protocol stack of the first device.

13. The system of claim 12, wherein the memory further stores instructions that when executed cause the processors to perform operations comprising:

storing in memory the first unique identifier, the first network address for the second device, and a first timestamp indicating a time the first unique identifier was sent to the second device to create the record before receiving the second information sent from the second device;

generating a second timestamp indicating a time a request for a resource identified by the second unique identifier was received from the second device;

using the second unique identifier to retrieve the first timestamp and the first network address from the memory; and determining that a time difference between the first timestamp and the second timestamp is less than a threshold period of time.

14. The system of claim 12, wherein the memory further stores instructions that when executed cause the processors to perform operations comprising:

identifying a first network protocol address cluster of which the first network protocol address is a member; and assigning the second network protocol address to a second network protocol address cluster that is associated with the first network protocol address cluster.

15. The system of claim 12, the operations comprising:

receiving a request for an advertisement from a given IPv6 address;

determining a geolocation based on the given IPv6 address;

selecting an advertisement based on the geolocation; and causing the advertisement to be sent to the given IPv6 address.

\* \* \* \* \*